(12) United States Patent
Tsirkin et al.

(10) Patent No.: US 10,379,764 B2
(45) Date of Patent: Aug. 13, 2019

(54) VIRTUAL MACHINE PAGE MOVEMENT FOR ENCRYPTED MEMORY

(71) Applicant: Red Hat, Inc., Releigh, NC (US)

(72) Inventors: Michael Tsirkin, Lexington, MA (US); Henri Han van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 155 days.

(21) Appl. No.: 15/592,954

(22) Filed: May 11, 2017

(65) Prior Publication Data

US 2018/0329638 A1    Nov. 15, 2018

(51) Int. Cl.
G06F 3/06      (2006.01)
G06F 12/14     (2006.01)
G06F 9/455     (2018.01)

(52) U.S. Cl.
CPC .......... *G06F 3/0623* (2013.01); *G06F 3/065* (2013.01); *G06F 3/0619* (2013.01); *G06F 3/0685* (2013.01); *G06F 9/45558* (2013.01); *G06F 12/1408* (2013.01); *G06F 2009/4557* (2013.01); *G06F 2009/45575* (2013.01); *G06F 2009/45579* (2013.01); *G06F 2009/45583* (2013.01);
(Continued)

(58) Field of Classification Search
CPC .... G06F 3/0623; G06F 3/0685; G06F 3/0619; G06F 3/065; G06F 12/1408; G06F 2009/45583; G06F 2009/45587; G06F 2009/4557; G06F 9/45558; G06F 2212/1052; G06F 12/14; G06F 2212/402; G06F 21/62; G06F 21/6209; G06F 2009/45575; G06F 2009/45579; G06F 200/45583
See application file for complete search history.

(56) References Cited

U.S. PATENT DOCUMENTS 7,484,073  B2   1/2009   Cohen et al.
8,495,318  B2   7/2013   Tremaine et al.
8,719,545  B2   5/2014   Pandey et al.
(Continued)

FOREIGN PATENT DOCUMENTS

WO       2011078861       6/2011

OTHER PUBLICATIONS

Mashtizadeh, et al., "XvMotion: Unified Virtual Machine Migration over Long Distance", Stanford University; VMware, Inc., Jun. 19-20 2014, 13 pages.
(Continued)

*Primary Examiner* — Matthew Smithers
(74) *Attorney, Agent, or Firm* — Lowenstein Sandler LLP

(57) ABSTRACT

Systems and methods for migrating encrypted storage blocks in a security enhanced manner. An example method may comprise: selecting, by a processing device, a storage block from a plurality of storage blocks comprising encrypted content, the storage block being associated with a computing process; restricting access of the computing process to the storage block; causing the storage block to be decrypted using a first cryptographic input and encrypted using a second cryptographic input; copying the storage block from a first location within the plurality of storage blocks to a second location within the plurality of storage blocks; and providing access of the computing process to the storage block at the second location.

20 Claims, 6 Drawing Sheets

(52) U.S. Cl.
CPC .............. *G06F 2009/45587* (2013.01); *G06F 2212/1052* (2013.01)

(56) References Cited

U.S. PATENT DOCUMENTS

| | | | | |
|---|---|---|---|---|
| 9,170,950 | B2* | 10/2015 | Dube | G06F 12/084 |
| 9,563,569 | B2 | 2/2017 | Tsirkin | |
| 2014/0208111 | A1* | 7/2014 | Brandwine | H04L 63/0428 |
| | | | | 713/171 |
| 2015/0242159 | A1* | 8/2015 | Tsirkin | G06F 3/0647 |
| | | | | 711/162 |
| 2016/0092678 | A1* | 3/2016 | Probert | G06F 9/45558 |
| | | | | 713/193 |
| 2016/0378522 | A1* | 12/2016 | Kaplan | G06F 12/1408 |
| | | | | 718/1 |
| 2016/0378688 | A1* | 12/2016 | Rozas | G06F 12/1408 |
| | | | | 713/190 |
| 2017/0032119 | A1* | 2/2017 | Dore | G06F 21/53 |
| 2017/0206175 | A1* | 7/2017 | Sliwa | G06F 12/1408 |
| 2018/0032447 | A1* | 2/2018 | Kaplan | G06F 12/1009 |
| 2018/0060237 | A1* | 3/2018 | Leslie-Hurd | G06F 21/53 |
| 2018/0307435 | A1* | 10/2018 | van Riel | G06F 3/0647 |

OTHER PUBLICATIONS

"Secure Encrypted Virtualization Key Management", Advanced Micro Devices, Aug. 2016, 68 pages.

Kaplan, et al., "AMD Memory Encryption", Advanced Micro Devices, Inc., Apr. 21, 2016, 12 pages.

* cited by examiner

US 10,379,764 B2

VIRTUAL MACHINE PAGE MOVEMENT FOR ENCRYPTED MEMORY

TECHNICAL FIELD

The present disclosure is generally related to data storage management, and more particularly, to moving and organizing encrypted data.

BACKGROUND

Modern computer systems often encrypt data within data storage devices to protect a computer system against a variety of attacks. Although data is typically encrypted when it is stored on a hard disk, it often remains unencrypted within main memory. This may leave the data vulnerable to snooping by an unauthorized administrator or unauthorized executable code. Non-volatile memory technology has increased the vulnerability because the non-volatile memory may be physically removed from a system with the data intact, similar to a hard drive. Modern systems have attempted to reduce this vulnerability by using memory devices that provide encryption. The encryption may be performed at the hardware level and may conceal underlying data from executable code that is tasked with managing the data.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
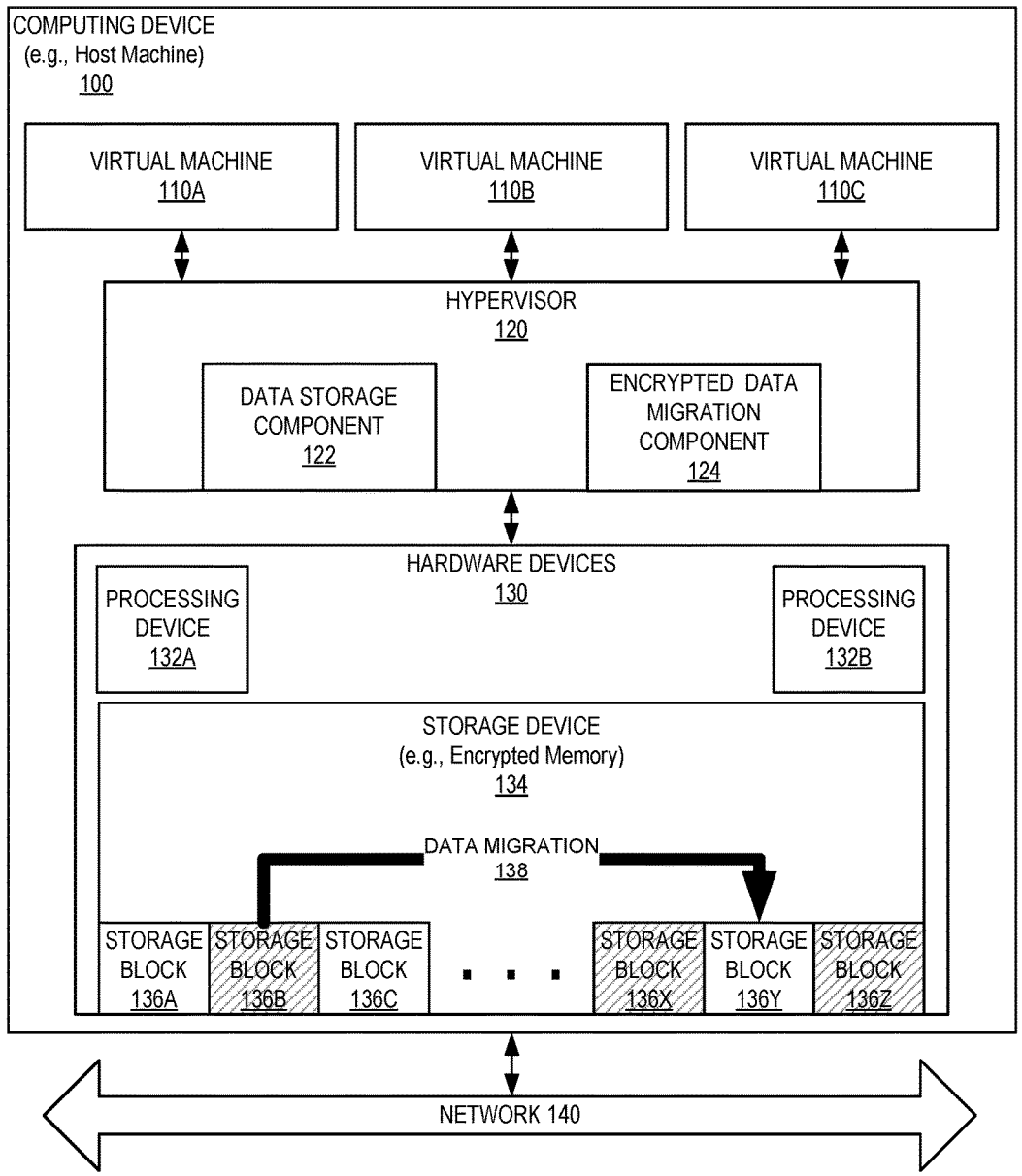
FIG. 1 depicts a high-level block diagram of an example computer system architecture that migrates encrypted data in a security enhanced manner, in accordance with one or more aspects of the present disclosure.

Computer systems often use cryptographic functions to encrypt data stored within a storage device. The cryptographic functions often use variations in cryptographic input to enhance security and cause multiple instances of identical content to appear different once encrypted. Some cryptographic systems provide this variation by using a cryptographic key that is based on hardware embedded information of the data storage device. For example, a cryptographic key may be based on the physical address where the data is stored. This may enhance security but may cause the data to become inaccessible when moved. This may be problematic for executable code performing storage management functions because the storage management functions may be responsible for moving and organizing the data to optimize access to the data. In a virtualized computer system, a hypervisor may perform storage management functions for one or more virtual machines. In the past, the hypervisor was typically provided with the ability to decrypt the data so that the hypervisor could move the data within the data storage device, but this may present a security vulnerability if the hypervisor is compromised.

Aspects of the present disclosure address the above and other deficiencies by providing technology that enables storage management features of a computing device to move data without accessing the data in an unencrypted form. The storage management features may be in the form of executable code of a kernel or other executable module and may detect that a storage block with encrypted content should be moved to optimize a data storage device. The storage blocks may be any portion of data storage that is capable of storing data and may include portions of volatile or non-volatile data storage. The encrypted content may be generated using a cryptographic function and each storage block may use a different cryptographic input (e.g., cryptographic key). The cryptographic function may be executed by the underlying hardware and some or all of the cryptographic input (e.g., decryption key) may be concealed or temporarily hidden from the storage management features.

In one example, the storage management features may be executed by a hypervisor and may move one or more encrypted storage blocks associated with a virtual machine to a new location. The storage blocks may be memory pages that have been assigned to a virtual machine and are managed by both the virtual machine and a hypervisor. The storage management features of the hypervisor may restrict one or more computing processes of the virtual machine from accessing the storage block to avoid any changes from occurring while the storage block is being moved. The storage management features may then cause underlying hardware to decrypt the storage block using a first cryptographic input and encrypt the storage block using a second cryptographic input. The first cryptographic input may include cryptographic bit sequence that is specific to the location of the storage block (e.g., location dependent) and the second cryptographic input may be a cryptographic bit sequence that is location independent. The second cryptographic input may function as a transport key that is used to encrypt the content of the storage block in preparation of a move or migration. The storage management features may then copy the storage block from its original location within the plurality of storage blocks to a new location within the same plurality of storage blocks. The storage management features may then cause the content to be encrypted at the new location using a cryptographic key based on the new location and re-enable the virtual machine to access the storage block at the new location. Throughout the move, the content of the storage block assigned to the virtual machine may remain in an encrypted form that conceals the content from the hypervisor performing the move.

The systems and methods described herein include technology that enables data movement in a security enhanced computing environment. In particular, aspects of the present disclosure may enable a kernel or other executable module to move data that is encrypted with a location based encryption without making the data inaccessible or exposing the data in an unencrypted form to the kernel. This may enhance the performance and security of a computing system because the kernel may be able to organize the encrypted data within a data storage device to enhance access to the encrypted data. The organization of the data may involve defragmenting the encrypted data so that it is more contiguous or may involve realigning the data so that it is more easily accessed using existing or alternative storage access units (e.g., block, word, page). In one example, the storage management features of a kernel (e.g., hypervisor or host operating system) may be able to perform data organization of a virtual machine's encrypted data while it is in main memory even though the main memory uses location based data encryption. In another example, the storage management features of a first computing process may be able to perform data organization of encrypted data of a second computing process even though the storage device uses a location based data encryption. The first and second computing processes may be a part of the same machine or different machines (e.g., physical or virtual machines) and the storage device may be a volatile or non-volatile storage device.

Various aspects of the above referenced methods and systems are described in details herein below by way of examples, rather than by way of limitation. The examples provided below discuss a virtualized computer system where the data movement may be performed by aspects of a hypervisor, a host operating system, a virtual machine, or a combination thereof. In other examples, the data movement may be performed in a non-virtualized computer system that is absent a hypervisor or other virtualization features discussed below.

FIG. 1 depicts an illustrative architecture of elements of a computing device 100, in accordance with an embodiment of the present disclosure. It should be noted that other architectures for computing device 100 are possible, and that the implementation of a computing device utilizing embodiments of the disclosure are not necessarily limited to the specific architecture depicted.

Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc.

Hypervisor 120 may also be known as a virtual machine monitor (VMM) and may provide virtual machines 110A-C with access to one or more features of the underlying hardware devices 130. In the example shown, hypervisor 120 may run directly on the hardware of computing device 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a data storage component 122 and an encrypted data migration component 124. Components 122 and 124 may each be separated into one or more components or may be included within the same component.

Data storage component 122 may analyze a storage device 134 to detect when one or more portions of storage device 134 may be reorganized to optimize access to data within the storage device. Data storage component 122 may analyze aspects of one or more storage blocks (e.g., ownership, time, location, size) and may select a storage block that may be migrated to enhance the performance of the storage device. Data storage component 122 may restrict access to the storage block before, during, or after the move in order to avoid data being lost during the move. Data storage component 122 may interact with encrypted data migration component 124 to perform a data migration 138.

Encrypted data migration component 124 may migrate one or more storage blocks 136A-Z to new locations. Encrypted data migration component 124 may interact one or more hardware devices 130 of the computing device 100 to encrypt and decrypt storage blocks 136A-Z. This may cause the storage block that is being migrated to change its encryption from using a cryptographic key that is based on a specific location of the storage block (e.g., location dependent) to a cryptographic key that is not based on the specific location of the storage block (e.g., location independent). Encrypted data migration component 124 may then update the storage device 134 by copying over the encrypted content of the storage block to a new location, as illustrated by data migration 138. The features of data storage component 122 and encrypted data migration component 124 are discussed in more detail below in regards to FIG. 2.

Hardware devices 130 may provide hardware functionality for performing computing tasks. Hardware devices 130 may include one or more processing devices 132A-B and one or more storage devices 134. One or more of hardware devices 130 may be split into multiple separate devices or consolidated into one or more hardware devices. For example, storage device 134 may include multiple different storage devices and some of the storage blocks (e.g., 136A-C) may be on a first storage device and some of the storage blocks (e.g., 136X-Z) may be on a second storage device. One or more of hardware device 130 may be absent from hardware devices 130 and may instead be partially or completely emulated by executable code.

Processing devices 132A and 132B may include one or more processors that are capable of executing the computing tasks discussed above in regards to components 122 and 124. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 134.

Storage device 134 may include volatile or non-volatile data storage. Volatile data storage (e.g., non-persistent storage) may store data for any duration of time but may lose the data after a loss of power or power cycle. Non-volatile data storage (e.g., persistent storage) may store data for any duration of time and may retain the data beyond a loss of power. In one example, storage device 134 may include one or more registers (e.g., processor registers) or memory devices (e.g., main memory). In another example, storage device 134 may include one or more mass storage devices, such as hard drives, solid-state storage (e.g., Solid State Drives (SSD)), other data storage devices, or a combination thereof. In a further example, storage device 134 may include a combination of one or more registers, one or more memory devices, one or more mass storage devices, other data storage devices, or a combination thereof, which may be arranged in a cache hierarchy. Storage device 134 may store encrypted data within one or more storage blocks 136A-Z.

Storage blocks 136A-Z may be any physical data storage or logical data storage for storing, organizing, or accessing data. A storage block may include a contiguous or non-contiguous sequence of bytes or bits. A storage block may have a block size which may be the same or different from a physical block size of the underlying hardware. The block size may be a fixed-size, such as a particular integer value (e.g., 4 KB) or may be a variable-size that varies within a range of integer values. Each of the storage blocks 136A-Z may have the same block size or may have different block sizes. In one example, storage blocks 136A-Z may be memory blocks and each of the memory blocks may correspond to a memory page, multiple memory pages, or a portion of a memory page. In another example, each of the storage blocks 136A-Z may correspond to a portion (e.g., sector) of a mass storage device (e.g., hard disk) or other storage device.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
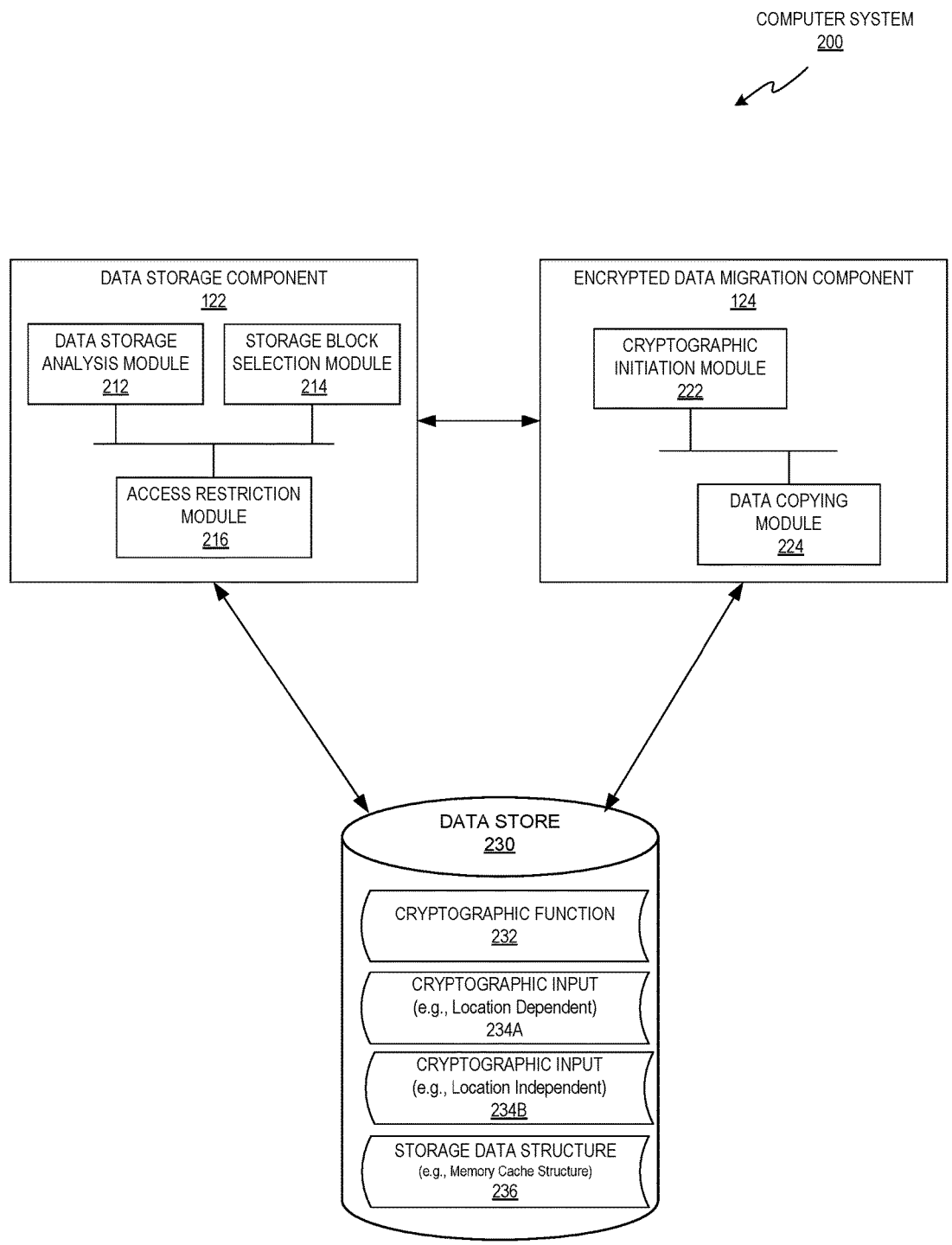
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include a data storage component 122 and an encrypted data migration component 124.

Data storage component 122 may enable computer system 200 to analyze one or more storage devices to identify portions of the storage device that may be re-organized to enhance the performance of computer system 200. As illustrated, data storage component 122 may include a data storage analysis module 212, a storage block selection module 214, and an access restriction module 216.

Data storage analysis module 212 may analyze data associated with one or more storage blocks to identify storage blocks that may be related to one or more other storage blocks. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage blocks. The spatial data may be any data that relates to the location of one or more storage blocks with respect to the storage device. The locations may be a particular location (e.g., address) or a relative location (e.g., adjacent to) and may include logical locations (e.g., virtual address or address range) or physical locations (e.g., physical address or address range) of the storage block. The contextual data may be any data that provides a context of a particular storage block or content within the particular storage block and may indicate a thread, process, user, host, virtual machine, or a combination thereof that is associated with the particular storage block. In one example, the temporal data, spatial data, or contextual data associated with the storage blocks may be analyzed and or weighted to calculate a relationship score. The relationship score may be a probabilistic value that indicates the probability that separate storage blocks or groups of storage blocks are related or associated with one another. The probabilistic value may be represented in any form such as decimals, fractions, percentages, ratios, other forms, or combination thereof.

Storage block selection module 214 may access data gathered or generated by data storage analysis module 212 and use it to detect a storage block that may be moved to enhance an overall performance of the computer system 200. Storage block selection module 214 may access the analytical data (e.g., temporal, spatial, and/or contextual data) associated with one or more storage blocks and may select a storage block that may be moved to enhance the computer systems use of the storage device. In one example, storage block selection module 214 may select one or more storage blocks that exceed (e.g., above or below) a predetermined threshold. Storage block selection module 214 may identify particular storage blocks or groups of storage blocks and provide them to access restriction module 216.

Access restriction module 216 may control access to the storage blocks before, during, or after the move in order to avoid data being lost during a move. As discussed above, the storage blocks may be assigned or associated with one or more computing processes that access and modify the storage blocks. Prior to migrating content of a storage block, the access restriction module 216 may restrict access of the one or more computing processes to the storage block. In one example, access restriction module 216 may prohibit all forms of access by the one or more computing processes to the storage block, which may include read access and write access. In another example, access restriction module 216 may provide a computing process with read access but may restrict write access or may store any write requests (e.g., subsequent modifications) in one or more data structures (e.g., queues). The stored write requests may then be applied at any point before, during, or after the migration has begun or completed.

Access restriction module 216 may restrict access to some computing processes (e.g., first set of computing processes) and may enable other computing processes (e.g., second set) to access the storage blocks. This may enable the storage block to remain unchanged by the first set of computing processes while the one or more computing processes of the second set perform the data migration procedure on the encrypted data. In one example, the storage blocks may be assigned or associated with one or more computing processes of a virtual machine but may be migrated by one or more other computing processes, such as those of a hypervisor or host operating system. In this situation, the computing processes of the virtual machine may be restricted from accessing the storage blocks but the computing processes of the hypervisor may be able to access and modify the storage blocks to perform the migration.

Access restriction module 216 may restrict computing processes in multiple different ways. In one example, access restriction module 216 may pause or terminate the one or more computing processes that are associated with the storage block. When the computing processes are executed by a virtual machine, this may involve pausing or terminating the particular computing process of the virtual machine, a group of computing processes of the virtual machine, the entire virtual machine, or a combination thereof. In another example, access restriction module 216 may allow the one or more computing processes to continue to execute but may cause access requests (e.g., read requests and/or write requests) to the storage block to fail. This may involve modifying one or more storage data structures 236 that are associated with the one or more storage blocks. For example, access restriction module 216 may update the storage data structure 236 to invalidate, remove, or indicate a corresponding storage block is restricted. This may cause subsequent requests associated with the storage block to be delayed or fail (e.g., return error message indicating storage block is inaccessible or busy).

Storage data structure 236 may include references corresponding to the one or more storage blocks. Each reference may identify (e.g., point to) the beginning, middle, end, or other portion of the one or more storage blocks. Storage data structure 236 may be a memory cache data structure or other storage data structure that corresponds to a caching system, a file system, a database system, other storage system, or a combination thereof. In one example, storage data structure 236 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After identifying a storage block to be moved, the access restriction module 216 may update the memory cache data structure by invalidating the pointer entries for one or more of the storage blocks and may flush the address-translation cache from one or more processing devices (e.g., virtual processors or physical processors) to remove references to the storage block.

Encrypted data migration component 124 may perform a migration of one or more storage blocks identified by the data storage component 122 without having to access the data in an unencrypted form. In the example shown in FIG. 2, encrypted data migration component 124 may include a cryptographic initiation module 222 and a data copying module 224.

Cryptographic initiation module 222 may interact with one or more underlying hardware devices of computer system 200 to initiate one or more transformations on the content of the identified storage block. A first transformation may involve decrypting the encrypted content of the storage block using a first cryptographic input (e.g., location dependent key) and a second transformation may involve encrypting (e.g., re-encrypting) the content of the storage block using a second cryptographic input (e.g., location independent key). The decrypted contents may remain hidden (e.g., concealed, kept secret) from the cryptographic initiation module 222 and any computing process (e.g., hypervisor process) that initiated the decryption. The transformations initiated by the cryptographic initiation module 222 may cause the underlying hardware devices (e.g., cryptographic features of a processor) to access cryptographic function 232 and cryptographic inputs 234A-B (e.g., cryptographic keys) to transform the content of the storage block being migrated. In one example, the cryptographic function 232 and cryptographic keys (e.g., location dependent and location independent keys) are stored and accessed by the underlying hardware devices but are concealed from both the hypervisor and virtual machine.

Cryptographic function 232 may be any function that is suitable for use in a standardized or proprietary cryptographic protocol and may involve one or more mathematical manipulations of content data. Cryptographic function 232 may map data of an arbitrary size to a bit sequence of a fixed size or variable size. In one example, cryptographic function 232 may be a cryptographic hash function that takes a content message as an input parameter and outputs a hash value, which may be referred to as cipher text, a digest, or a message digest. Cryptographic function 232 may include a private key cryptographic function a public key cryptographic function, other cryptographic function, or a combination thereof. In one example, cryptographic function 232 may be an "in-place" cryptographic function or include similar functionality that avoids copying the first storage block to another location during the execution of the cryptographic function (e.g., during encryption or during decryption).

An in-place cryptographic function may transform data within a storage block without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data (e.g., any number of bits, bytes, nibbles, words). In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be $O(\log n)$, $O(n)$, or other portion of "n", wherein "n" is the size (e.g., number of bits or bytes) of the unencrypted content data.

Cryptographic input 234A and 234B may include any data that is used to generate a cryptographic key or is used by cryptographic function 234 to encrypt or decrypt content data. Cryptographic input 234A and 234B may be any cryptographic bit sequence including encryption keys, decryption keys, public keys, private keys, symmetric keys, asymmetric keys, other cryptographic data, or a combination thereof. Cryptographic input 234A and 234B may include or be generated or derived from one or more initialization vectors, starting variables, other data, or a combination thereof. Cryptographic input 234A-B may include or be based on the spatial data, temporal data, or contextual data discussed above.

Cryptographic input 234A may be a cryptographic bit sequence that is associated with or based on a location of a storage block. The location of the storage block may be based on hardware embedded information of a processing device, a storage device, a machine (physical or virtual machine), or other information associated with a storage block. In one example, cryptographic input 234A may be based on location information (e.g., spatial data) that corresponds to the storage block. The location information may be relative to a particular storage device, such as a physical address, a logical address, other address, or a combination thereof. In other examples, cryptographic input 234A may also or alternatively be based on other location information such as information for the storage device containing the storage block or information about a processing device, interface, port, adapter, or other device for accessing the storage block. The location information may be based on data that is permanently or temporarily associated with (e.g., embedded within) a hardware device. In one example, this may cause each particular storage block to be associated with different cryptographic input 234A that is based on the location of the particular storage block. This may be advantageous because it may provide enhanced security protection but may cause content encrypted with a location based input to become inaccessible when moved to a different storage block.

Cryptographic input 234B may be similar to cryptographic input 234A but may be location independent and not tied to a location of a particular storage block. Cryptographic input 234B may function the same or similar to a transport key or migration key that enables the storage block to be transported between storage block locations in an encrypted form without becoming inaccessible. Cryptographic input 234B may be used to encrypt content of one or more storage blocks and then used to decrypt the content after it is moved to other locations. In one example, the cryptographic input 234B may be a cryptographic key or a pair of cryptographic keys that can be used to perform the encryption and subsequent decryption. In another example, the cryptographic input 234B may be used to generate (e.g., mathematically derive) one or more encryption keys and one or more decryption keys. Cryptographic input 234B may be based on information provided by the computing process that is initiating the encryption or decryption (e.g., hypervisor process). The information provided may be generated by the computing process initiating the transformation or by another computing process. The information provided may be randomly generated for temporary use during the migration. The duration of the temporary use may be based on a duration of a particular migration, a duration of the computing process, other duration, or a combination thereof.

Cryptographic initiation module 222 may prepare the content of a selected storage blocks for a migration by initiating a cryptographic feature of the computer system 200. In one example, the underlying hardware may execute the cryptographic function 232 using a combination of hardware features and lower-level executable code (e.g., firmware) without providing a higher-level executable code (e.g., kernel of hypervisor or host operating system) access to the cryptographic function, cryptographic input, unencrypted content, or a combination thereof. In another example, the cryptographic function may be executed by a portion of a kernel of a hypervisor or host operating system in combination with hardware and firmware features. The kernel may execute the cryptographic function 232 without providing higher-level executable code (e.g., guest operating system or applications) access to the cryptographic function, cryptographic input, unencrypted content, or a combination thereof. In either scenario, the higher-level code may be executing the migration and may not be capable of unencrypting the storage blocks because it may be exclusively performed by lower-level executable code and/or hardware. This may be advantageous because it may enhance security by reducing access to the cryptographic keys and the unencrypted data.

Data copying module 224 may update one or more storage devices by copying the encrypted content of the storage block to a new location and removing the encrypted content at the original location. In one example, the copying may involve a copy operation, move operation, a migrate operation, or other operation that physically manipulates the bits at the original location and/or at the new location. In another example, the copying may involve an operation that manipulates one or more pointers without physically manipulating the bits of the storage block at the original or new locations.

Figure 3:
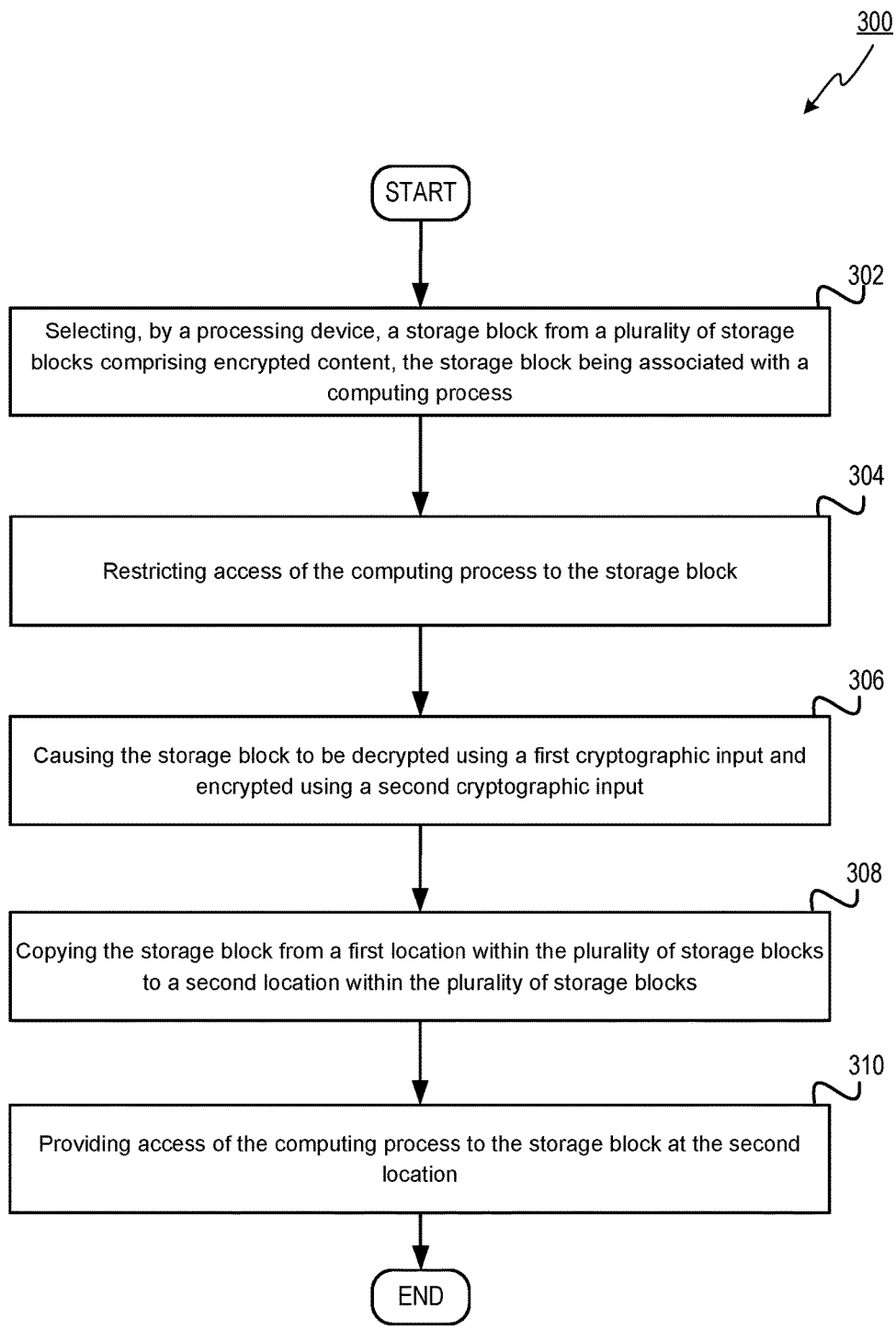
FIG. 3 depicts a flow diagram of an example method for migrating storage blocks with encrypted data in a security enhanced manner, in accordance with one or more aspects of the present disclosure.

FIG. 3 depicts a flow diagram of an illustrative example of a method 300 for migrating encrypted data in a security enhanced manner, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the processing device may select a storage block from a plurality of storage blocks with encrypted content. The plurality of storage blocks may each be encrypted using a cryptographic key that corresponds to a hardware feature of the respective storage block and the hardware feature may be based on a physical address of the respective storage block. The selected storage block may be associated with a particular computing process. The computing process may include one or more computing threads that are provided exclusive use or non-exclusive use (e.g., shared use) of the storage block. The computing process may be part of an operating system or application running on a physical or virtual machine. In one example, the plurality of encrypted storage blocks may be assigned to a virtual machine and decrypted content of the plurality of storage blocks may remain inaccessible to a hypervisor managing the virtual machine before, during, and after a migration of the storage block.

At block 304, the processing device may restrict access of the computing process to the storage block. In one example, restricting access of the computing process to the storage block may involve pausing or shutting down a virtual machine executing the computing process. In another example, restricting access of the computing process to the storage block may involve invalidating a page table entry corresponding to the storage block and flushing a translation cache (e.g., translation lookaside buffer) on multiple processors (e.g., physical or virtual processors) that contain references to at least one of the plurality of encrypted storage blocks.

At block 306, the processing device may cause the storage block to be decrypted using a first cryptographic input and encrypted using a second cryptographic input. The first cryptographic input may comprise a location dependent cryptographic key and the second cryptographic input may comprise a location independent cryptographic key. The first cryptographic input may comprise a cryptographic bit sequence that is concealed (e.g., hidden or kept secret) from a kernel of a hypervisor, a host operating system, a guest operating system, or a combination thereof. The second cryptographic input may be based on a cryptographic bit sequence generated by the kernel and subsequently used by the hardware to generate a cryptographic key for encryption and/or decryption. The decryption and the encryption may use an in-place cryptographic function that may avoid copying the storage block to another location during the encryption and/or decryption.

At block 308, the processing device may copy the storage block from a first location within the plurality of storage blocks to a second location within the plurality of storage blocks. Copying the first storage block may involve copying content of the storage block while the content is encrypted using the second cryptographic input (e.g., location independent cryptographic key). In one example, each of the plurality of encrypted storage blocks comprises a memory page stored in the same memory device and the first location and the second location each comprise a physical memory address of the same memory device. In another example, the plurality of encrypted storage blocks comprise memory pages stored across multiple memory devices and the first location may be in a first memory device and the second location may be in a second memory device. The first and second memory devices may be memory devices that were or were not manufactured separately and may be associated with the same or different caching levels (e.g., main memory) of a cache hierarchy.

At block 310, the processing device may provide access of the computing process to the storage block at the second location. As discussed above in regards to block 304, access to the storage block may be restricted while the storage block is being copied to the second location. Once the storage block has been copied, the access may be re-enabled. This may allow the computing process to continue accessing the storage block at its new location. In one example, the storage block may decrypted and then re-encrypted at the second location using another location based cryptographic input. The other location based cryptographic input may be similar to the first cryptographic input discussed above but may be based on the new second location and not the original first location. Responsive to completing the operations described herein above with references to block 310, the method may terminate.

In one example of method 300, the plurality of encrypted storage blocks may be stored in a main memory of a computing device and the selecting and the copying may occur as part of a defragmentation of the main memory. The defragmentation process may involve detecting, by a hypervisor, that the storage block is related to another storage block from the plurality of encrypted storage blocks. The hypervisor may also determine that the second location is closer to the other storage block and initiate the copying of the storage block to the second location to arrange or organize the multiple encrypted storage block in a more continuous manner. During defragmentation, the first cryptographic input and the second cryptographic input may be accessible to a hardware device performing a cryptographic function but may remain concealed from the hypervisor performing the defragmentation.

Figure 4:
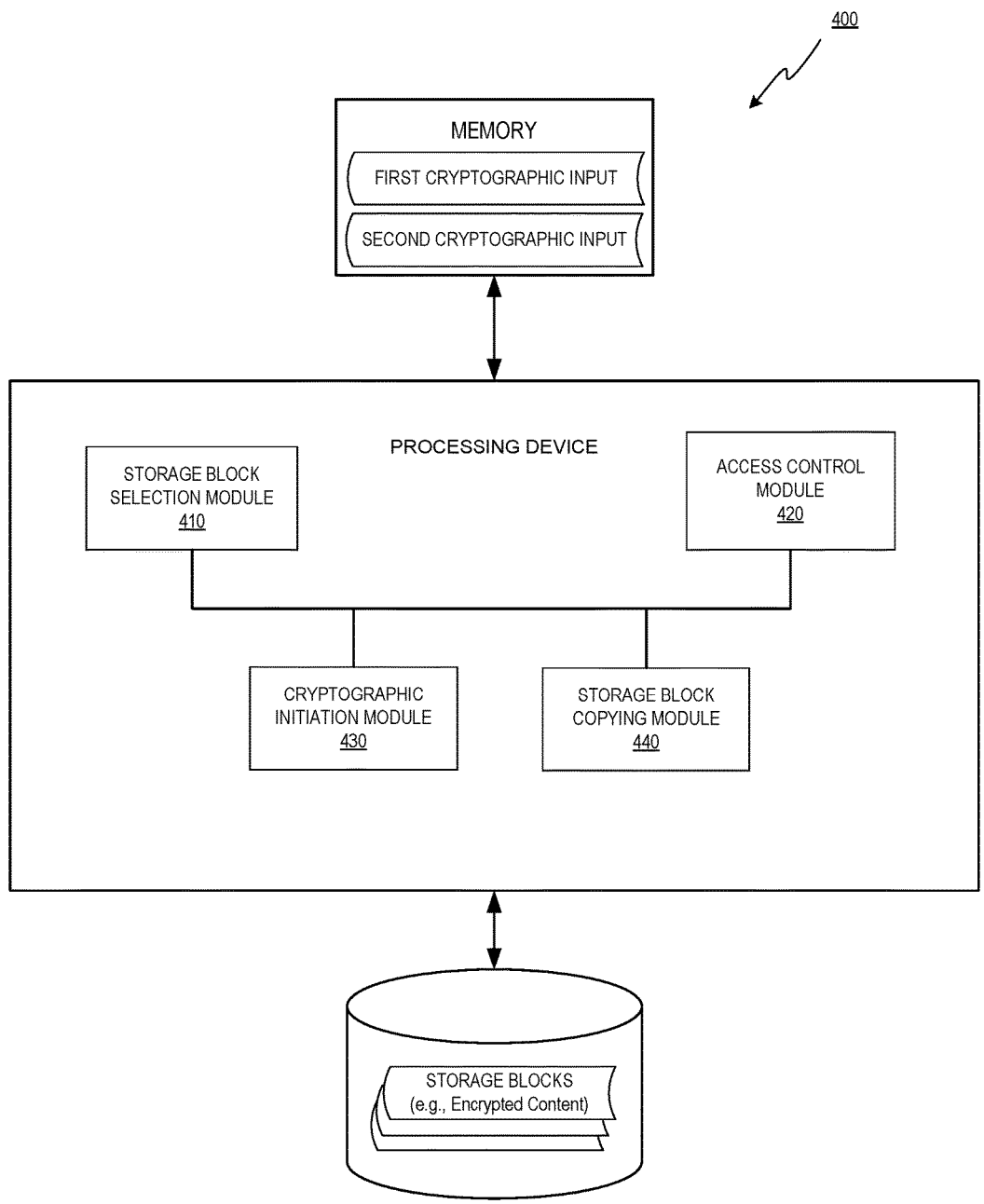
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and may include one or more processing devices and one or more memory devices. In the example shown, computer system 400 may include a storage block selection module 410, an access control module 420, a cryptographic initiation module 430, and a storage block copying module 440.

Storage block selection module 410 may enable the processing device to select a storage block from a plurality of storage blocks that have encrypted content. The encrypted storage blocks may each be encrypted using a cryptographic key that corresponds to a hardware feature of the respective storage block and the hardware feature may be based on a physical address of the respective storage block. The selected storage block may be associated with a particular computing process, such as a computing process of a virtual machine. The computing process may include one or more computing threads that are provided exclusive use or non-exclusive use (e.g., shared use) of the storage block. The computing process may be part of an operating system or application running on the virtual machine or physical machine. In one example, the plurality of encrypted storage blocks may be assigned to a virtual machine and decrypted content of the plurality of encrypted storage blocks may remain inaccessible to a hypervisor managing the virtual machine before, during, and after migration of the storage block.

Access control module 420 may enable the processing device to restrict access of the computing process to the storage block. In one example, restricting access of the computing process to the storage block may involve pausing or shutting down a virtual machine executing the computing process. In another example, restricting access of the computing process to the storage block may involve invalidating a page table entry corresponding to the storage block and flushing a translation cache (e.g., translation lookaside buffer) on multiple processors (e.g., physical or virtual processors) that contain references to at least one of the plurality of encrypted storage blocks.

Access control module 420 may enable the processing device to subsequently provide access of the computing process to the storage block at another location. Once the storage block has been copied the access may be re-enabled. This may enable the computing process to continue accessing the storage block at its new location. In one example, the storage block may be decrypted and then re-encrypted at the second location using another location based cryptographic input. The location based cryptographic input may be similar to the first cryptographic input discussed above but may be based on the new second location and not the first location.

Cryptographic initiation module 430 may enable the processing device to cause the storage block to be decrypted using a first cryptographic input and encrypted using a second cryptographic input. The first cryptographic input may comprise a location dependent cryptographic key and the second cryptographic input may comprise a location independent cryptographic key. The first cryptographic input may comprise a cryptographic bit sequence that is concealed (e.g., hidden or kept secret) from a kernel of a hypervisor, a host operating system, or a guest operating system. The second cryptographic input may be based on a cryptographic bit sequence generated by the kernel and subsequently used by the hardware to generate a cryptographic key for encryption and/or decryption. The decryption and the encryption may use an in-place cryptographic function that avoids copying the storage block to another location during the encryption and/or decryption.

Storage block copying module 440 may enable the processing device to copy the storage block from a first location within the plurality of storage blocks to a second location within the plurality of storage blocks. Copying the first storage block may involve copying content of the storage block while the content is encrypted using the second cryptographic input (e.g., location independent cryptographic key). In one example, each of the plurality of encrypted storage blocks comprises a memory page stored in the same memory device and the first location and the second location each comprise a physical memory address of the same memory device. In another example, the plurality of encrypted storage blocks comprise memory pages stored across multiple memory devices and the first location may be in a first memory device and the second location may be in a second memory device. The first and second memory devices may be memory devices that were or were not manufactured separately and may be associated with the same caching level (e.g., main memory) of a cache hierarchy.

Figure 5:
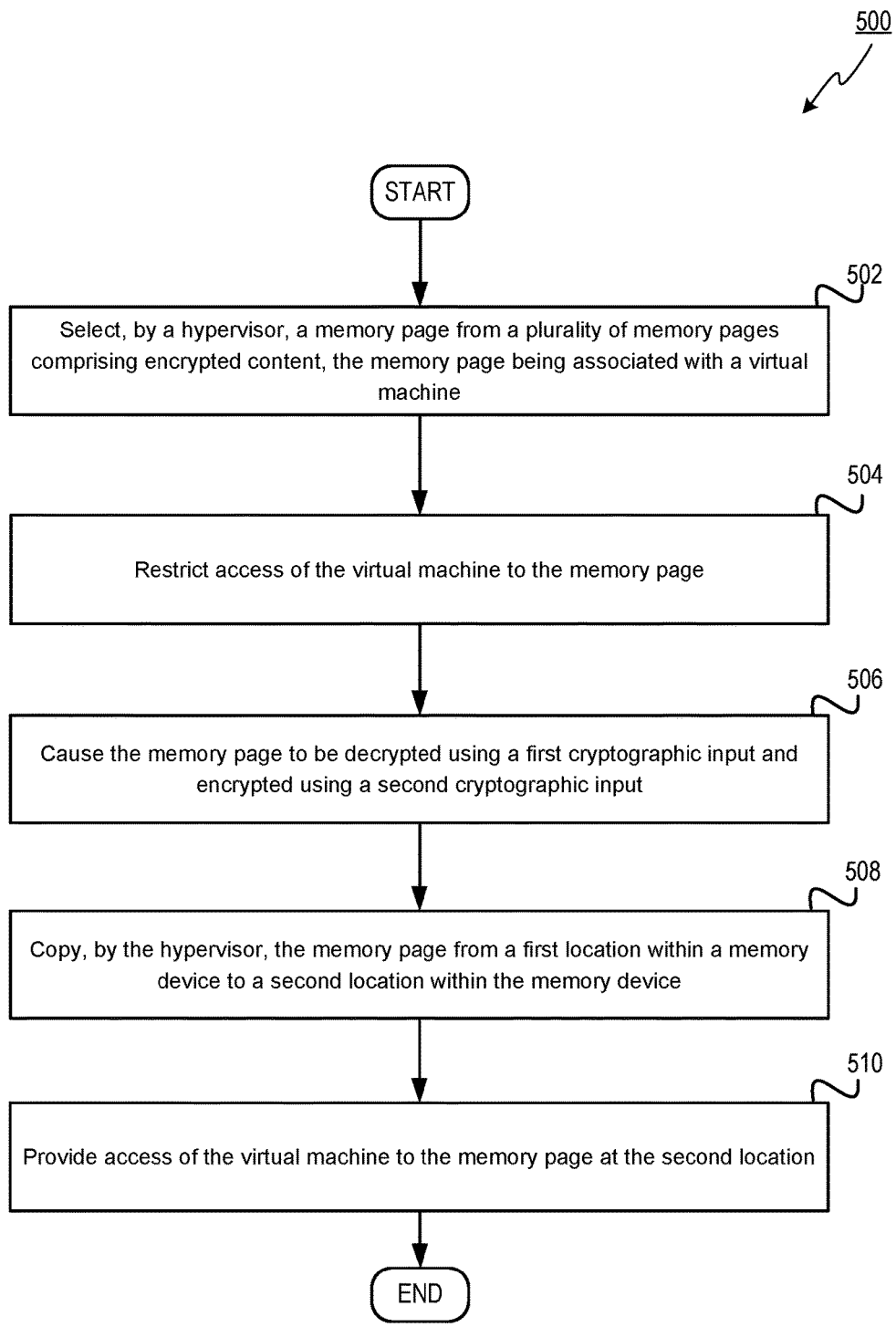
FIG. 5 depicts a flow diagram of an example method for migrating memory pages with encrypted data in a security enhanced manner, in accordance with one or more aspects of the present disclosure.

FIG. 5 depicts a flow diagram of one illustrative example of a method 500 for migrating encrypted data in a security enhanced manner, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, a processing device may select a memory page from a plurality of memory pages having encrypted content. The memory pages may each be encrypted using a cryptographic key that corresponds to a hardware feature of the respective memory page and the hardware feature may be based on a physical address of the respective memory page. The selected memory page may be associated or assigned to a particular virtual machine. The virtual machine may include one or more computing processes and may be provided exclusive use or non-exclusive use (e.g., shared use) of the memory page. In one example, the plurality of encrypted memory pages may be assigned to the virtual machine and the decrypted content of the plurality of memory pages may remain inaccessible to the hypervisor managing the virtual machine before, during, and after a migration of the memory page.

At block 504, the processing device may restrict access of the virtual machine to the memory page. In one example, restricting access of the virtual machine may involve pausing or shutting down the virtual machine. In another example, restricting access of the virtual machine to the memory page may involve invalidating a page table entry corresponding to the memory page and flushing a translation cache (e.g., translation lookaside buffer) on multiple processors (e.g., physical or virtual processors) that contain references to at least one of the plurality of encrypted memory pages.

At block 506, the processing device may cause the memory page to be decrypted using a first cryptographic input and encrypted using a second cryptographic input. The first cryptographic input may comprise a location dependent cryptographic key and the second cryptographic input may comprise a location independent cryptographic key. The first cryptographic input may comprise a cryptographic bit sequence that is concealed (e.g., hidden or kept secret) from the hypervisor. The second cryptographic input may be based on a cryptographic bit sequence generated by the hypervisor and subsequently used by the hardware to generate a cryptographic key for encryption and/or decryption. The decryption and the encryption may use an in-place cryptographic function that avoids copying the memory page to another location during encryption and/or decryption.

At block 508, the processing device may copy the memory page from a first location within a memory device to a second location within the memory device. The copying may be performed by the hypervisor or caused by the hypervisor without the virtual machine being aware the memory page is being moved or migrated. Copying the first memory page may involve copying content of the memory page while the content is encrypted using the second cryptographic input (e.g., location independent cryptographic key). In one example, each of the plurality of encrypted memory pages are stored in the same memory device and the first location and the second location each comprise a physical memory address of the same memory device. In another example, the plurality of encrypted memory pages are stored across multiple memory devices and the first location may be in a first memory device and the second location may be in a second memory device. The first and second memory devices may be memory devices that were or were not manufactured separately and may or may not be associated with the same caching level (e.g., main memory) of a cache hierarchy.

At block 510, the processing device may provide access of the virtual machine to the memory page at the second location. As discussed above in regards to block 504, access to the memory page may be restricted when the memory page is being copied to the second location. Once the memory page has been copied the access may be re-enabled. This may enable the virtual machine (e.g., firmware, guest operating system, and/or guest applications) to continue accessing the memory page at its new location. In one example, the memory page may decrypted and then re-encrypted at the second location using another location based cryptographic input. The location based cryptographic input may be similar to the first cryptographic input discussed above but may be based on the new second location and not the first location. Responsive to completing the operations described herein above with references to block 510, the method may terminate.

In one example of method 500, the plurality of encrypted memory pages may be stored in a main memory of a computing device and the selecting and the copying occur during defragmentation of the main memory. The defragmentation process may involve detecting, by the hypervisor, that the memory page is related to another memory page from the plurality of encrypted memory pages assigned to the virtual machine. The hypervisor may also determine that the second location is closer to the other memory page and initiate the copying of the memory page to the second location to arrange or organize the multiple encrypted memory page in a more continuous manner. During defragmentation, the first cryptographic input and the second cryptographic input may be accessible to a hardware device performing a cryptographic function but may remain concealed from the hypervisor.

Figure 6:
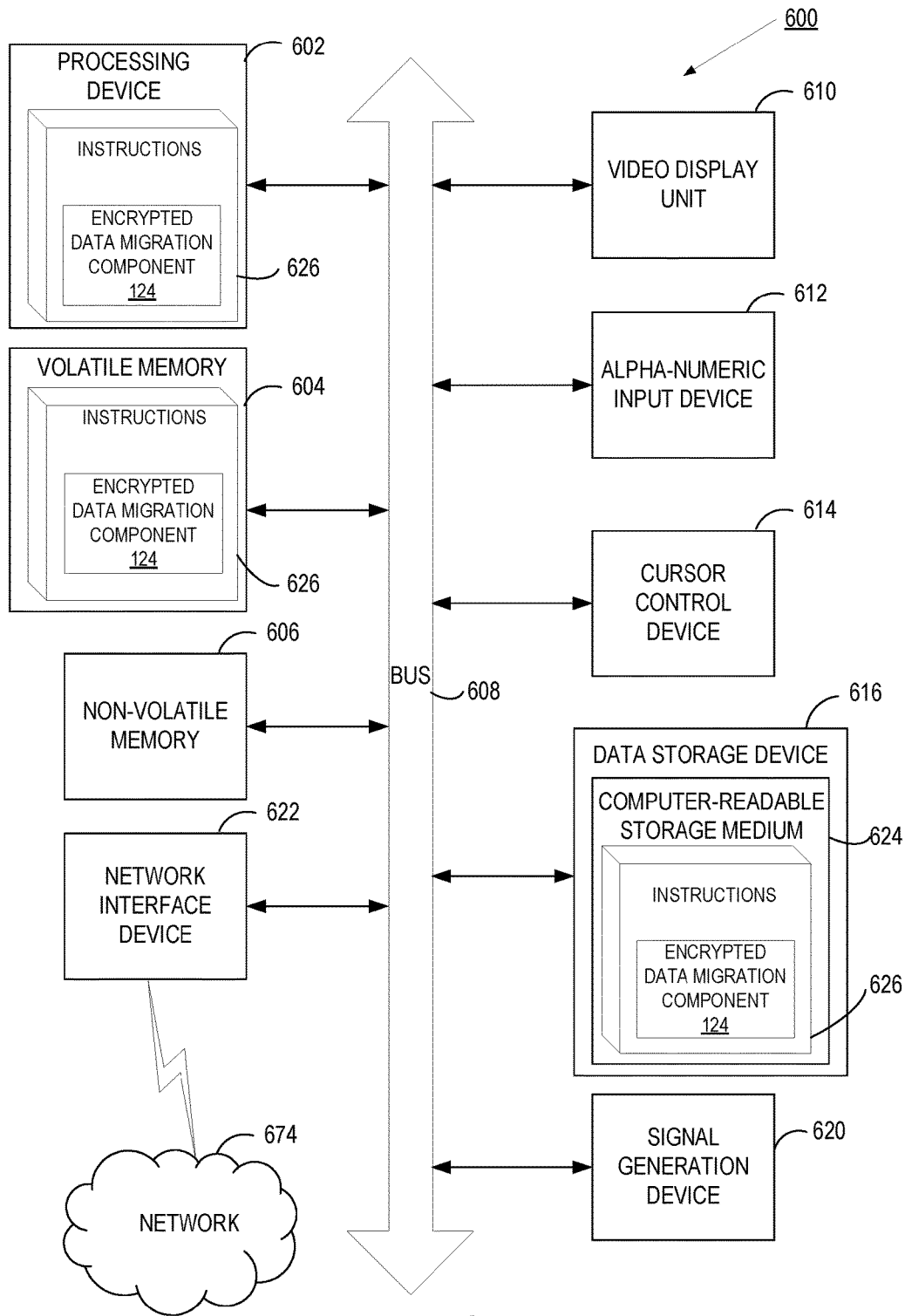
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding encrypted data migration component 124 and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
selecting, by a processing device, a storage block from a plurality of storage blocks that comprise encrypted content, wherein the storage block is associated with a computing process;
restricting access of the computing process to the storage block;
causing the storage block to be decrypted using a first cryptographic input that is location dependent and subsequently encrypted using a second cryptographic input that is location independent;
copying the storage block from a first location within the plurality of storage blocks to a second location within the plurality of storage blocks; and
providing access of the computing process to the storage block at the second location.

2. The method of claim 1, wherein each of the plurality of storage blocks comprises a memory page stored in a memory device, and the first location and the second location each comprise a physical memory address of the memory device.

3. The method of claim 1, wherein the first cryptographic input comprises a cryptographic bit sequence that is concealed from a kernel, and wherein the second cryptographic input is based on a cryptographic bit sequence generated by the kernel, wherein the kernel is a portion of at least one of a hypervisor, a host operating system, or a guest operating system.

4. The method of claim 1, wherein the plurality of storage blocks are assigned to a virtual machine and decrypted content of the plurality of storage blocks remains inaccessible to a hypervisor managing the virtual machine.

5. The method of claim 4, further comprising:
detecting, by the hypervisor, that the storage block is related to another storage block from the plurality of storage blocks;
determining, by the hypervisor, that the second location is closer to the other storage block; and
initiating, by the hypervisor, a migration of the storage block to the second location.

6. The method of claim 1, wherein the plurality of storage blocks are stored in a main memory of a computing device and wherein the selecting and the copying occur during defragmentation of the main memory.

7. The method of claim 1, wherein the first cryptographic input that is location dependent comprises a cryptographic key generated in view of a physical address of the respective storage block.

8. The method of claim 1, wherein the decryption and the encryption use an in-place cryptographic function that avoids copying the storage block to another location during the encryption and during the decryption.

9. The method of claim 1, wherein restricting access of the computing process to the storage block comprises:
invalidating a page table entry corresponding to the storage block; and
flushing a translation cache on multiple processors that contain references to at least one of the plurality of storage blocks.

10. A system comprising:
a memory;
a processing device operatively coupled to the memory, the processing device to:
select a storage block from a plurality of storage blocks that comprise encrypted content, wherein the storage block is associated with a computing process;
restrict access of the computing process to the storage block;
cause the storage block to be decrypted using a first cryptographic input that is location dependent and subsequently encrypted using a second cryptographic input that is location independent;
copy the storage block from a first location within the plurality of storage blocks to a second location within the plurality of storage blocks; and
provide access of the computing process to the storage block at the second location.

11. The system of claim 10, wherein each of the plurality of storage blocks comprises a memory page stored in a memory device and the first location and the second location each comprise a physical memory address of the memory device.

12. The system of claim 10, wherein the first cryptographic input comprises a cryptographic bit sequence that is concealed from a kernel, and wherein the second cryptographic input is based on a cryptographic bit sequence generated by the kernel, wherein the kernel is a portion of at least one of a hypervisor, a host operating system, or a guest operating system.

13. The system of claim 10, wherein the plurality of storage blocks are assigned to a virtual machine and decrypted content of the plurality of storage blocks remains inaccessible to a hypervisor managing the virtual machine.

14. The system of claim 13, wherein the processing device is further to:
detect, by the hypervisor, that the storage block is related to another storage block from the plurality of storage blocks;
determine, by the hypervisor, that the second location is closer to the other storage block; and
initiate, by the hypervisor, a migration of the storage block to the second location.

15. The system of claim 10, wherein the plurality of storage blocks are each encrypted using a cryptographic key in view of a hardware feature corresponding to the respective storage block, the hardware feature comprising a physical address of the respective storage block.

16. A non-transitory machine-readable storage medium storing instructions that cause a processing device to:
select, by a hypervisor, a memory page from a plurality of memory pages that comprise encrypted content, wherein the memory page is associated with a virtual machine;
restrict access of the virtual machine to the memory page;
cause the memory page to be decrypted using a first cryptographic input that is location dependent and subsequently encrypted using a second cryptographic input that is location independent;
copy, by the hypervisor, the memory page from a first location within a memory device to a second location within the memory device; and
provide access of the virtual machine to the memory page at the second location.

17. The non-transitory computer readable medium of claim 16, wherein the plurality of memory pages are assigned to the virtual machine and decrypted content of the plurality of memory pages remains inaccessible to the hypervisor hosting the virtual machine.

18. The non-transitory computer readable medium of claim 16, wherein the plurality of memory pages are stored in a main memory of a computing device that executes the hypervisor and the virtual machine, and wherein the selecting and the copying occur during a defragmentation of the main memory.

19. The non-transitory computer readable medium of claim 16, wherein the first cryptographic input comprises a cryptographic bit sequence that is concealed from the hypervisor, and wherein the second cryptographic input is based on a cryptographic bit sequence generated by the hypervisor.

20. The non-transitory computer readable medium of claim 16, wherein the plurality of memory pages are each encrypted using a cryptographic key that corresponds to a hardware feature of the respective storage block, the hardware feature comprising a physical address of the respective storage block.

\* \* \* \* \*